US006224166B1

(12) United States Patent
Chen

(10) Patent No.: US 6,224,166 B1
(45) Date of Patent: May 1, 2001

(54) BICYCLE HUB

(75) Inventor: Kun-Teng Chen, Taichung Hsien (TW)

(73) Assignee: Kun Teng Industry Co., Ltd., Taichung Hsien (TW)

( * ) Notice: Subject to any disclaimer, the term of this patent is extended or adjusted under 35 U.S.C. 154(b) by 0 days.

(21) Appl. No.: 09/425,354

(22) Filed: Oct. 22, 1999

(51) Int. Cl.[7] .......... B60B 27/00
(52) U.S. Cl. .......... 301/110.5; 384/545; 192/217.3
(58) Field of Search .......... 301/59, 105.1, 301/110.5, 124.1; 192/217.3; 384/545

(56) References Cited

U.S. PATENT DOCUMENTS 576,147 * 2/1897 Patterson .......... 384/545
606,217 * 6/1898 Hoffman .......... 192/217.3
616,094 * 12/1898 Farnell .......... 384/545
696,036 * 3/1902 Glover .......... 192/217.3

FOREIGN PATENT DOCUMENTS

533321 * 2/1922 (FR) .......... 384/545
5583 * 3/1896 (GB) .......... 384/545

* cited by examiner

*Primary Examiner*—Russell D. Stormer
(74) *Attorney, Agent, or Firm*—Merchant & Gould P.C.

(57) ABSTRACT

A bicycle hub includes a hollow hub shell, and an axle extending through the hub shell. The axle is formed integrally with diameter-enlarged first and second inner race portions that are respectively disposed in opposing first and second end portions of the hub shell. Each of the first and second inner race portions is formed with an inner race groove that opens toward a respective one of the first and second end portions of the hub shell. Annular first and second cap members are sleeved on the axle. Each of the first and second cap members has an outer race forming portion that extends into and that is mounted to a respective one of the first and second end portions of the hub shell. The outer race forming portion is formed with an outer race groove that opens toward the inner race groove in a respective one of the first and second inner race portions of the axle. A first ball-bearing unit is confined by the inner and outer race grooves in the first inner race portion and the outer race forming portion of the first cap member. A second ball-bearing unit is confined by the inner and outer race grooves in the second inner race portion and the outer race forming portion of the second cap member.

7 Claims, 4 Drawing Sheets

BICYCLE HUB

BACKGROUND OF THE INVENTION

1. Field of the Invention

This invention relates to a bicycle hub, more particularly to a bicycle hub that can bear a greater amount of impact forces during advancing of the bicycle.

2. Description of the Related Art

FIG. 1 illustrates a conventional bicycle hub 1. The bicycle hub 1 includes a hub shell 7 having two opposite ends, and an axle 2 extending through the two opposite ends of the hub shell 7. Each of the two opposite ends of the hub shell 7 is formed with an inner recess 101. A bearing receiving bowl 3 is received in the inner recess 101, and has an inner race groove 301 for receiving a ball-bearing unit 4 therein. Each ball-bearing unit 4 is confined by the inner race groove 301 and an outer race member 5 that extends into the inner race groove 301 to abut against the ball-bearing unit 4. A threaded nut 6 is sleeved on and engages threadedly the axle 2 for abutting tightly against the outer race member 5.

It is noted that a great amount of impact forces from the axle 2 are transmitted to the bearing receiving bowl 3 and the outer race member 5 during advancing of the bicycle. This may result in damage to the bearing receiving bowl 3 and the outer race member 5. Since the bearing receiving bowl 3 is generally formed by punching a steel sheet to a desired shape, it is not sufficiently strong and is liable to be deformed and break when subjected to high impact forces during advancing of the bicycle on rugged and uneven surfaces.

SUMMARY OF THE INVENTION

Therefore, it is an object of the present invention to provide a bicycle hub that is capable of overcoming the aforementioned problem.

Accordingly, a bicycle hub of this invention comprises: a hollow hub shell having opposite first and second end portions; an axle extending rotatably through the first and second end portions of the hub shell, the axle being formed integrally with diameter-enlarged first and second inner race portions that are respectively disposed in the first and second end portions of the hub shell, each of the first and second inner race portions being formed with an inner race groove that opens toward a respective one of the first and second end portions of the hub shell; annular first and second cap members sleeved rotatably on the axle, each of the first and second cap members having an outer race forming portion that extends into and that is mounted to a respective one of the first and second end portions of the hub shell, the outer race forming portion being formed with an outer race groove that opens toward the inner race groove in a respective one of the first and second inner race portions of the axle; and first and second ball-bearing units, the first ball-bearing unit being confined by the inner and outer race grooves in the first inner race portion and the outer race forming portion of the first cap member, the second ball-bearing unit being confined by the inner and outer race grooves in the second inner race portion and the outer race forming portion of the second cap member.

BRIEF DESCRIPTION OF THE DRAWINGS

In drawings which illustrate an embodiment of the invention.

DETAILED DESCRIPTION OF THE PREFERRED EMBODIMENT

Figure 1:
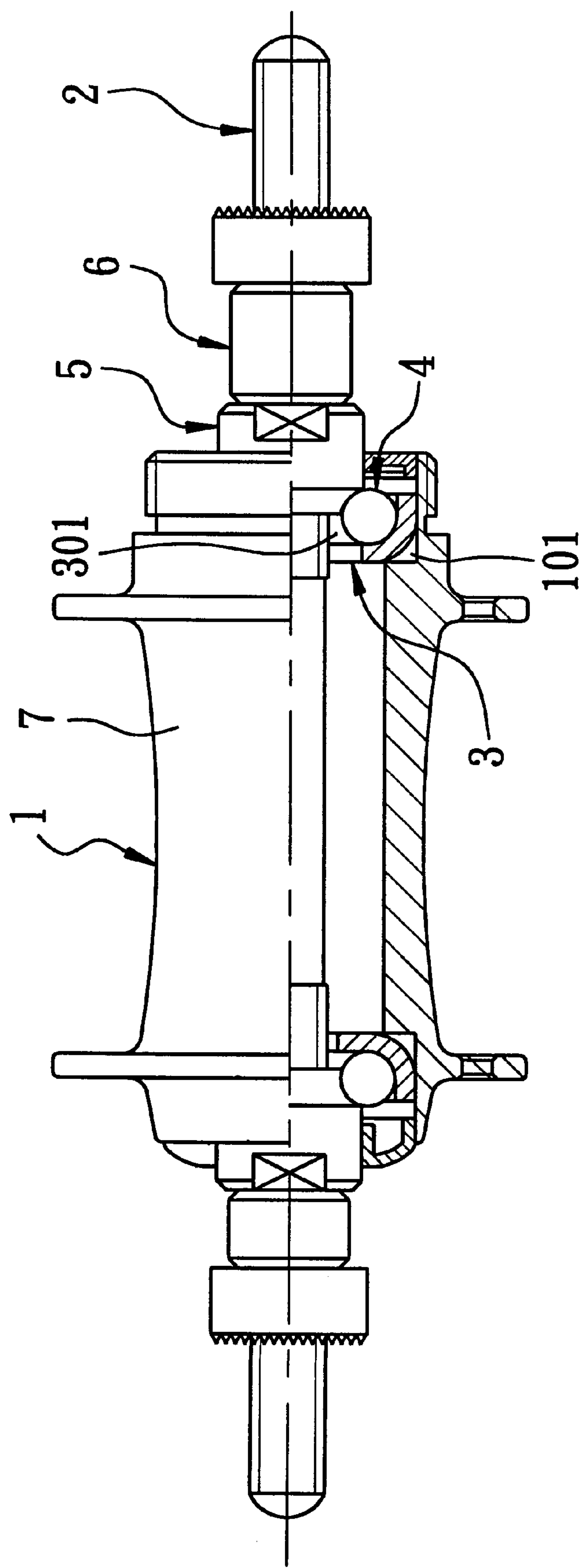
FIG. 1 is a cross-sectional side view of a conventional bicycle hub.
Figure 2:
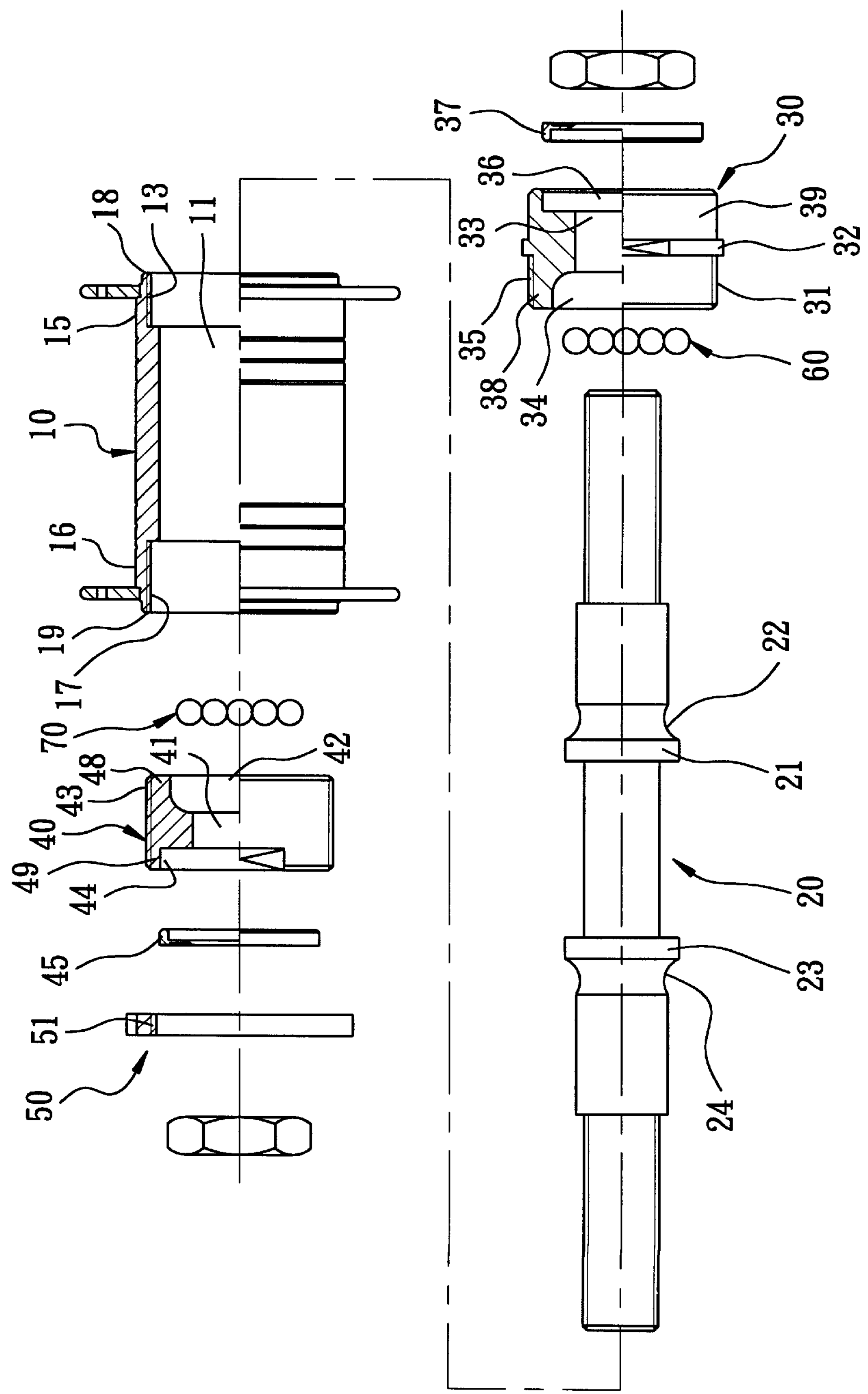
FIG. 2 is an exploded cross-sectional side view of a bicycle hub embodying this invention.
Figure 3:
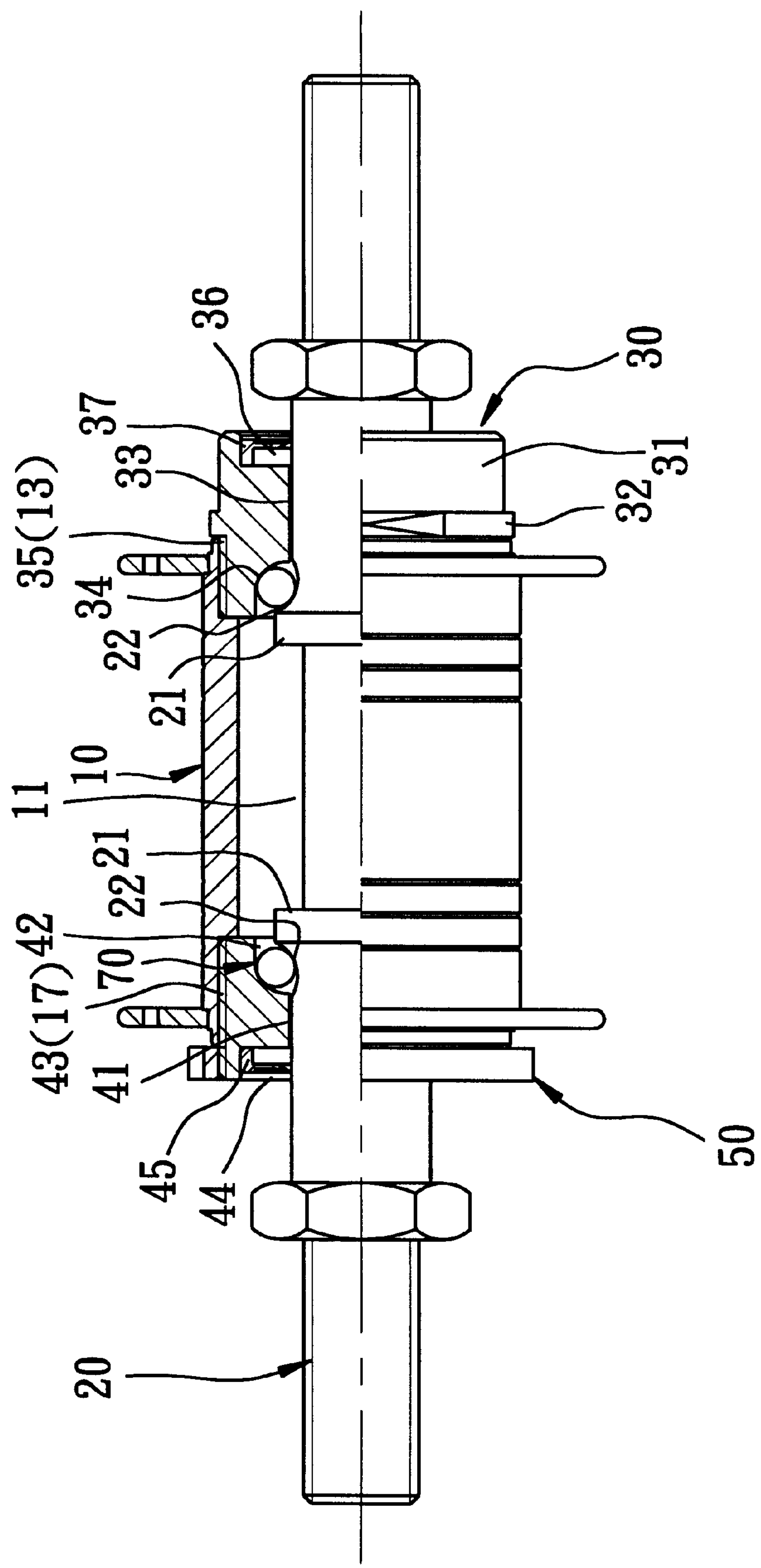
FIG. 3 is a cross-sectional side view of the bicycle hub of FIG. 2.

FIGS. 2 to 3 illustrate a bicycle hub embodying this invention. The bicycle hub of this invention includes a hollow hub shell 10 having a horizontally extending through-hole 11, opposite first and second end portions 15, 16, an axle 20 extending through the through-hole 11 and the first and second end portions 15, 16, first and second cap members 30, 40 sleeved rotatably on two opposite sides of the axle 20, respectively, and first and second ball-bearing units confined respectively by the first end portion 15 and the first cap member 30, and the second end portion 16 and the second cap member 40, respectively.

The first and second end portions 15, 16 of the hub shell 10 are formed with first and second internal screw threads 13, 17, respectively.

The axle 20 is formed integrally with diameter-enlarged first and second inner race portions 21, 23 that are respectively disposed in the first and second end portions 15, 16 of the hub shell 10. The first and second inner race portions 21, 23 are formed with first and second inner race grooves 22, 24 that open toward the first and second end portions 15, 16 of the hub shell 10, respectively. Each of the first and second inner race portions 21, 23 has a cross section greater than that of the axle 20.

The first cap member 30 is in the form of an annular body 31 having a first central hole 33 for passage of the axle 20 therethrough, a first outer race forming portion 38 that is formed integrally on the first annular body 31 and that extends into and is mounted to the first end portion 15 of the hub shell 10, and a first outer wall face 39 opposite to and extending outwardly from the first outer race forming portion 38. The first outer race forming portion 38 is formed with a first external screw thread 35 for threadedly engaging the first internal screw thread 13 of the first end portion 15 of the hub shell 10, and confines a first outer race groove 34 that opens toward the first inner race groove 22 of the first inner race portion 21 of the axle 20. The first outer wall face 39 is formed with a first cover receiving recess 36 around the first central hole 33 for receiving a first closure member 37 therein to seal the first end portion 15 of the hub shell 10. A radial outward stop flange 32 is disposed between the first outer race forming portion 38 and the first outer wall face 39, and extends radially and outwardly from the first cap member 30 so as to abut against a first distal end face 18 of the hub shell 10.

The second cap member 40 includes a second central hole 41 for passage of the axle 20 therethrough, a second outer race forming portion 48 that is formed integrally on the second cap member 40 and that extends into and is mounted to the second end portion 16 of the hub shell 10, and a second outer wall face 49 opposite to and extending outwardly from the second outer race forming portion 48. The second outer race forming portion 48 is formed with a second external screw thread 43 for threadedly engaging the second internal screw thread 17 of the second end portion 16 of the hub shell 10, and confines a second outer race groove 42 that opens toward the second inner race groove 24 of the second inner race portion 23 of the axle 20. The second outer wall face 49 is formed with a second cover receiving recess 44 around the second central hole 41 for receiving a second closure member 45 therein to seal the second end portion 16 of the hub shell 10. A locking ring 50 is sleeved threadedly on the second external screw thread 43 of the second cap member 40, and extends radially and outwardly relative to the second cap member 40 for abutting against a second distal end face 19 of the hub shell 10.

The first ball-bearing unit 60 is confined by the first inner and outer race grooves 22, 34 in the first inner race portion 21 and the first outer race forming portion 38 of the first cap member 30. Similarly, the second ball-bearing unit 70 is confined by the second inner and outer race grooves 24, 42 in the second inner race portion 23 and the second outer race forming portion 48 of the second cap member 40.

Figure 4:
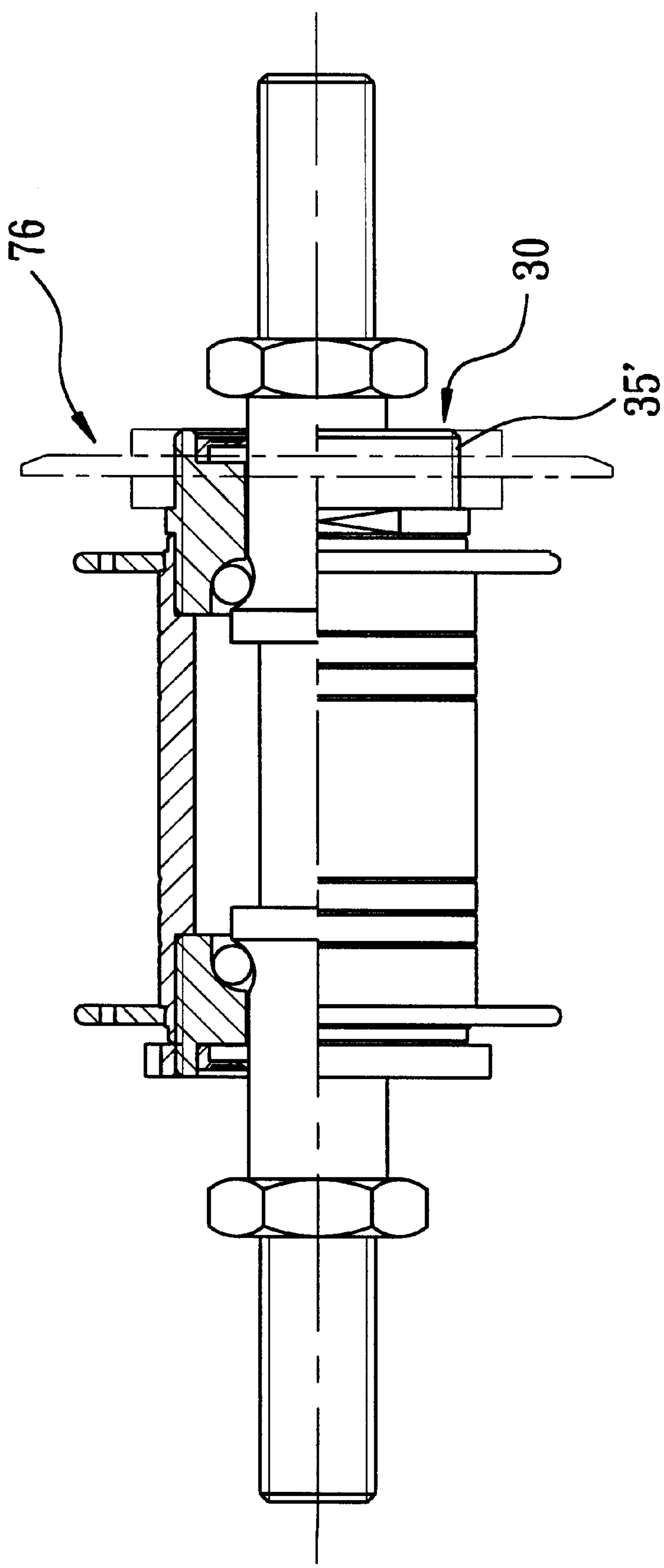
FIG. 4 is a cross-sectional side view of the bicycle hub of FIG. 2 with a sprocket mounted thereon.

Referring now to FIG. 4, the first cap member 30 is further formed with a sprocket mounting portion 35' that extends from the first outer wall face 39 in a direction away from the first end portion 15 of the hub shell 10. The sprocket mounting portion 35' is formed with an external screw thread for threadedly engaging a sprocket unit 76.

Since the first and second inner race portions 21, 23 are integrally formed on the axle 20 and each has a cross section larger than that of the axle 20, and since the first and second outer race forming portions 38, 48 are formed respectively as integral parts of the first and second cap members 30, 40, the overall strength of the bicycle hub of this invention is enhanced when compared to that of the aforementioned conventional bicycle hub.

With the invention thus explained, it is, apparent that various modifications and variations can be made without departing from the spirit of the present invention. It is therefore intended that the invention be limited only as recited in the appended claims.

I claim:

1. A bicycle hub comprising:

a hollow hub shell having opposite first and second end portions;

an axle extending rotatably through said first and second end portions of said hub shell, said axle being formed integrally with diameter-enlarged first and second inner race portions that are respectively disposed in said first and second end portions of said hub shell, each of said first and second inner race portions being formed with an inner race groove that opens toward a respective one of said first and second end portions of said hub shell;

annular first and second cap members sleeved rotatably on said axle, each of said first and second cap members having an outer race forming portion that extends into and that is mounted to a respective one of said first and second end portions of said hub shell, said outer race forming portion being formed with an outer race groove that opens toward said inner race groove in a respective one of said first and second inner race portions of said axle; and first and second ball-bearing units, said first ball-bearing unit being confined by said inner and outer race grooves in said first inner race portion and said outer race forming portion of said first cap member, said second ball-bearing unit being confined by said inner and outer race grooves in said second inner race portion and said outer race forming portion of said second cap member; and wherein said first cap member has a sprocket mounting portion that extends from said outer race forming portion in a direction away from said hub shell and that is formed with an external screw thread.

2. The bicycle hub as claimed in claim 1, wherein said first end portion of said hub shell is formed with an internal screw thread, and said outer race forming portion of said first cap member is formed with an external screw thread for threadedly engaging said internal screw thread.

3. The bicycle hub as claimed in claim 1, wherein said first cap member is formed with a radial outward stop flange that abuts against a distal end face of said hub shell.

4. The bicycle hub as claimed in claim 1, wherein said first cap member has a central hole for passage of said axle therethrough, and an outer wall face opposite to said outer race groove and formed with a cover receiving recess around said central hole, said bicycle hub further comprising a closure member mounted in said cover receiving recess to seal said first end portion of said hub shell.

5. The bicycle hub as claimed in claim 4, wherein said second end portion of said hub shell is formed with an internal screw thread, and said second cap member is formed with an external screw thread for threadedly engaging said internal screw thread.

6. The bicycle hub as claimed in claim 5, further comprising a locking ring that engages threadedly said external screw thread of said second cap member and that extends radially and outwardly relative to said second cap member for abutting against a distal end face of said hub shell.

7. The bicycle hub as claimed in claim 1, wherein said second cap member has a central hole for passage of said axle therethrough, and an outer wall face opposite to said outer race groove and formed with a cover receiving recess around said central hole, said bicycle hub further comprising a closure member mounted in said cover receiving recess to seal said second end portion of said hub shell.

* * * * *